US011985231B2

(12) United States Patent
Tong et al.

(10) Patent No.: US 11,985,231 B2
(45) Date of Patent: May 14, 2024

(54) INTEGRITY ATTESTATION FOR APPLICATION CLIPS

(71) Applicant: Apple Inc., Cupertino, CA (US)

(72) Inventors: Eric Kar Wai Tong, Vancouver (CA); Hervé Sibert, Le Mans (FR)

(73) Assignee: APPLE INC., Cupertino, CA (US)

( * ) Notice: Subject to any disclaimer, the term of this patent is extended or adjusted under 35 U.S.C. 154(b) by 388 days.

(21) Appl. No.: 17/506,253

(22) Filed: Oct. 20, 2021

(65) Prior Publication Data

US 2022/0393862 A1 Dec. 8, 2022

Related U.S. Application Data

(60) Provisional application No. 63/197,087, filed on Jun. 4, 2021.

(51) Int. Cl.

*H04L 9/08* (2006.01)
*G06F 8/71* (2018.01)
*H04L 9/32* (2006.01)

(52) U.S. Cl.

CPC .............. *H04L 9/0847* (2013.01); *G06F 8/71* (2013.01); *H04L 9/0825* (2013.01); *H04L 9/0894* (2013.01); *H04L 9/3268* (2013.01)

(58) Field of Classification Search

CPC ... H04L 9/0847; H04L 9/0825; H04L 9/0894; H04L 9/3268; G06F 8/71; G06F 8/65; G06F 8/61

See application file for complete search history.

(56) References Cited

U.S. PATENT DOCUMENTS 8,719,586 B1 * 5/2014 Paleja .................... G06F 21/10 726/20
9,098,366 B1 * 8/2015 Adib ......................... G06F 8/61
2011/0307738 A1 * 12/2011 Hilerio ...................... G06F 8/61 715/810
2017/0147810 A1 * 5/2017 Richardson ........... H04W 12/37

* cited by examiner

*Primary Examiner* — Michael Simitoski
*Assistant Examiner* — Hany S. Gadalla
(74) *Attorney, Agent, or Firm* — Kilpatrick Townsend & Stockton LLP

(57) ABSTRACT

Certain embodiments disclosed herein provide attestation for a transient version of an application while reusing the attestation and the cryptographic key on which the attestation is based for the full version of the application should the user obtain the full version of the application prior to the transient version being deleted. As an example, a computing device can detect an upgrade event corresponding to replacing an application clip with the full version of the application, and associate the cryptographic key already stored in a key database with the full version of the application. Associating the existing key with the full version of the application enables the full application to automatically take over the attestation previously provided for the application clip, saving time and resources that would otherwise be used for establishing a new attestation for the full version of the application.

20 Claims, 9 Drawing Sheets

710 — Install a transient version of an application, the transient version of the application corresponding to a full version of the application, and generate cryptographic key(s)

720 — Receive from a first server, a certification in response to an attestation request of a cryptographic key associated with the transient version of the application, the cryptographic key configured for providing an attestation to a second server by the transient version of the application once certified by the first server 730 — Store, in a key database, the cryptographic key in association with the transient version of the application and a state indicator, and use the key to send attestations 740 — Detect an upgrade event corresponding to replacing the transient version of the application with the full version of the application, the upgrade event including installing the full version of the application onto the computing device and uninstalling the transient version 750 — In response to detecting the upgrade event, associate the cryptographic key as stored in the key database with the full version of the application and change the state indicator, thereby enabling the full version of the application to provide the attestation to the second server using the cryptographic key

INTEGRITY ATTESTATION FOR APPLICATION CLIPS

CROSS-REFERENCE TO RELATED APPLICATION

This application claims the benefit of U.S. Provisional Application No. 63/197,087, filed Jun. 4, 2021, entitled "Integrity Attestation for Application Clips." The disclosure of this application is incorporated by reference herein in its entirety.

BACKGROUND

In some instances, a bad actor may attempt to modify an application running on a computing device so that it does not operate as intended by a developer. For example, an application may place restrictions on various functions supported by the application until the bad actor purchases a license. To avoid purchasing a license, a bad actor may modify the application to circumvent these restrictions. Some computing devices can provide an attestation indicative of an application's integrity/validity. When an application executing on a computing device connects to a remote service in order to perform some function, the computing device can provide an attestation based on a verification of the application. The verification may be performed in part by a secure circuit of the computing device. If the verification is successful, the secure circuit generates the requested attestation, which is signed with a cryptographic key maintained by the secure circuit. This cryptographic key may be specific to the application and/or the current user of the application. After the attestation has been issued by the secure circuit, the application may provide the attestation to the remote service in order to attest that the application has not been improperly modified. In many instances, implementing a verification system in this manner can reduce the likelihood that a computing device is executing an improperly modified application. It is desirable to manage the security of various applications that are, or can be, installed on a computing device.

BRIEF SUMMARY

Aspects of the present disclosure include methods for obtaining a transient version of an application and providing attestation of the transient version of the application. Aspects of the present disclosure also include upgrading from the transient version of an application to a corresponding full version of the application while continuing to provide the attestation used for the transient version but for the full version of the application.

As an example embodiment, a method includes installing, by the computing device, a transient version of an application. The transient version of the application corresponds to a full version of the application. The method further includes receiving, from a first server, a certification of a cryptographic key associated with the transient version of the application. The cryptographic key is configured for providing an attestation to a second server by the transient version of the application once the cryptographic key has been certified by the first server. The method further includes storing, in a key database of the computing device, a cryptographic key in association with the transient version of the application. The computing device detects an upgrade event corresponding to replacing the transient version of the application with the full version of the application, and the upgrade event includes installing the full version of the application onto the computing device. The method further includes the computing device, in response to detecting the upgrade event, associating the cryptographic key already stored in the key database with the full version of the application, thus enabling the full version of the application to provide the attestation to the second server using the existing cryptographic key.

Another aspect of the present disclosure includes a system comprising one or more processors and a memory that includes instructions that when executed by the one or more processors, cause the one or more processors to perform one or more methods as described above.

Other aspects of the present disclosure include a non-transitory computer-readable medium, that stores instructions that, when executed by one or more processors, cause the one or more processors to perform the methods described above.

A better understanding of the nature and advantages of embodiments of the present disclosure may be gained with reference to the following detailed description and the accompanying drawings.

DETAILED DESCRIPTION

Figure 1:
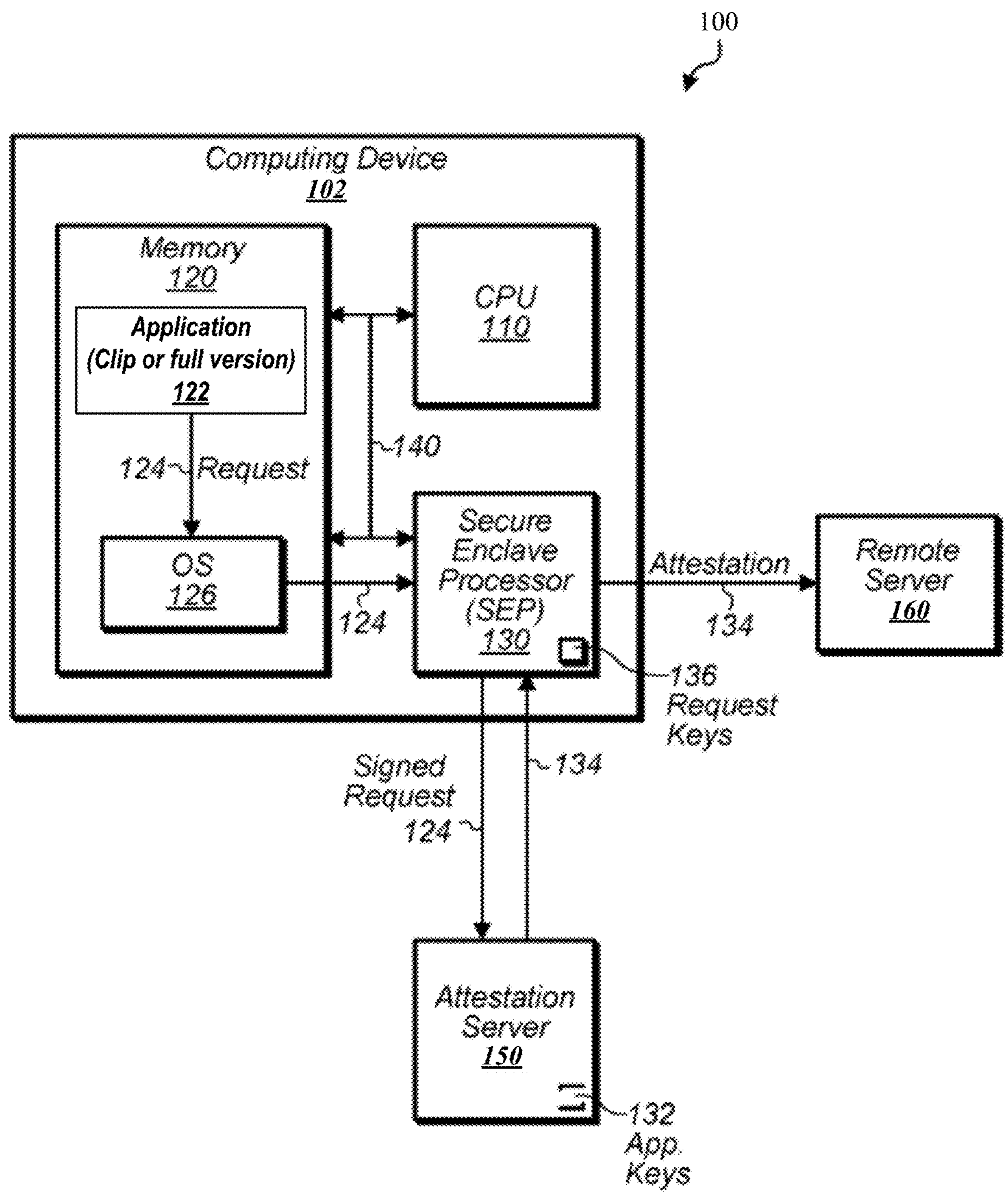
FIG. 1 illustrates an exemplary system for providing attestation of applications according to certain aspects of the present disclosure.

Many applications installed on a user's computing device are used to exchange information with a server or servers operated by the application developer. In order to verify that an installation of the application is valid and has not been subject to tampering, some application repository operators can, at the application developer's request, provide an attestation as to the integrity of the copy of the application installed on a user's computing device. In some examples, an application attestation process that makes use of cryptographic keys securely generated on the device can be provided by an application repository ("app store") operator. A private key can then be stored in the device's key database as associated with the application and used throughout the life of the application to attest to the integrity of messages sent from the computing device to the developer's servers. As part of a typical uninstall procedure, the cryptographic key would typically automatically deleted when the application is deleted (uninstalled).

Application developers can also use a small (partial) version of an application to provide a quick preview/functionality of the application to users or potential users. Such a transient version of an application can be called, as an example, an "application clip." The application clip provides immediate access to a portion of the application's functionality with a device on which the full version of the application itself has not been installed. This immediate access can be provided at a time when there is a current need for the portion of the application's functionality, as determined, for example, by the location of the device, based on a scanned quick response (QR) code, or based on a selected link associated with the application.

Application clips may not be involved in attestation. Firstly, application clips usually have a limited life on a computing device, resulting in what is perceived as a smaller window of opportunity for tampering and correspondingly lower risk. An application clip is normally automatically deleted either when the full application is installed or after a predetermined time period. The user of the computing device can also delete the application clip prior to either one of these events. Secondly, the application clip is an independent application with its own structure and application identifier, meaning that, if attestation is provided for use with the application clip, an attestation would again need to be created for the full application since the application clip's cryptographic key will be deleted with the application clip as part of the process of installing the full application. The additional attestation verification process uses time and resources for what, from the developer's point of view, are essentially duplicate attestations.

Certain embodiments disclosed herein provide attestation for application clips while reusing the attestation and the cryptographic key for the full application, e.g., when the user of the computing device obtains the full application prior to the application clip being deleted. In one example, a key database (sometimes referred to as a "device keychain" or, for purposes of this description, a "keychain") on the computing device stores the cryptographic key associated with the attestation for the application clip, using an application group identifier that is common to both the application clip and the application. The computing device then monitors for an un-installation of the application clip being part of an upgrade event, that is, an event during which the application clip on the user's computing device is replaced with the full application. The upgrade event can be detected by tracking a state indicator for the stored cryptographic key.

If the application clip is un-installed as part of an upgrade event, the cryptographic key is not deleted from the keychain on the computing device as would normally be the case if the un-installation were not part of an upgrade event. Since the full application is associated with the common application group identifier and the same key, the full application will automatically take over the attestation previously provided for the application clip after the upgrade. The initial attestation and key generation processes, once completed for the application clip, do not need to be repeated for the full application, saving time, and encouraging the application developer to provide attestation for the application clip so that the integrity of the application clip can be verified.

I. Integrity Attestation

In exemplary embodiments described below, a computing device can use cryptographic keys verified by a first server to provide integrity attestation for an application running on a computing device. This server, as an example, may be associated with an application repository. The integrity attestation can be provided to a second server, for example, a server associated with the application developer.

FIG. 1 illustrates an exemplary system for providing attestation of applications according to certain aspects of the present disclosure. System 100 includes a computing device 102, which includes a central processing unit (CPU) 110, memory 120, and a secure enclave processor (SEP) 130 coupled together via an interconnect 140. Memory 120 includes an application 122 and an operating system (OS) 126. Application 122 can be either a full version of an application or a transient version of an application. System 100 further includes a first server, attestation server 150. Application 122, in various embodiments, is executable to connect to a remote service, which, in the illustrated embodiment, is provided by a second server, remote server 160. Application 122 may correspond to any suitable application, which is potentially vulnerable to undesired modification, including a transient version of the application or a full version of a corresponding application as described herein. Similarly, remote server 160 may correspond to any suitable computer system and may provide any suitable service. For example, application 122 may be an application attempting to retrieve content from remote server 160 in order to present that content to the user and application 122 may have been developed by the provider of the remote service.

As noted above, in various embodiments, application 122 can provide an attestation 134 to remote server 160 in order to attest to its integrity—e.g., that it has not been modified in some unauthorized manner. In some examples, the attestation includes an identifier of the application and a hash value signed by the developer of the application and generated from the application. The attestation may be signed using a private cryptographic key of a key pair and may be produced in part by signing a challenge issued by the second server. In some embodiments, remote server 160 may request an attestation 134 as a prerequisite to establishing a connection with application 122 (or providing any service requested by application 122). In some embodiments, attestation 134 is a signed challenge issued by remote server 160 and signed using a private application key maintained by SEP 130. In some embodiments, remote server 160 may perform a user authentication distinct from verification of the received attestation 134. As shown, application 122 may issue a request 124 to OS 126 in order to have an attestation 134 generated.

OS 126, in various embodiments, is executable to manage various operations of computing device 102. In the illustrated embodiment, OS 126 facilitates interfacing application 122 and SEP 130, which may be provided by an application programming interface (API) supported by OS 126. Accordingly, application 122 may issue request 124 as an API call to OS 126, which, in turn, may provide request 124 to SEP 130. OS 126 may also return an attestation 134 generated by responding to the request via the API to application 122 for delivery to remote server 160. In some embodiments, OS 126 also participates in the verification of application 122 and, in some embodiments, even generates attestation 134.

SEP 130, in various embodiments, is a secure circuit configured to perform cryptographic services for computing device 102. As used herein, the term "secure circuit" refers to one of a class of circuits that is configured to perform one or more services and return an authenticated response to an external requester. Responses from SEP 130 are authenticated through the use of cryptography such as providing a digital signature or encrypted data.

In some embodiments, SEP 130 is configured to generate an attestation 134 for an application 122 and to verify the application 122 prior to providing attestation 134. This verification may include receiving various metadata from application 122 attesting the identity of application 122 and its integrity. In various embodiments, this metadata includes an application certificate supplied by a developer and including one or more signed hash values generated from a valid copy of application 122. In some embodiments, the certificate may also include an identify of the application as well as various other criteria. For example, the certificate may also include a common application group identifier (group ID) common to both an application clip and the corresponding full version of an application. Accordingly, in response to receiving this metadata, SEP 130 may verify the application certificate and verify that hash values generated from application 122 match those in the application certificate. In some embodiments, this verification may be performed in part (or entirely) by operating system 126. For example, in one embodiment, OS 126 may generate one or more hash values from application 122 and supply them to SEP 130, which compares them against the signed hash values supplied by the developer. In another embodiment, OS 126 performs the comparison and indicates a result of the comparison to SEP 130, which verifies the result prior to generating an attestation 134. In various embodiments, this verification may be performed during an enrollment of application 122 and/or during generation of attestation 134.

In some embodiments, before a request 124 for an attestation can be issued, application 122 may perform an initial enrollment in which SEP 130 generates an application key (or key pair) for use in subsequent generations of attestations 134 for the same application or applications with the same application group ID, such as a full version of an application corresponding to an application clip. A public portion of the application key (or a public key of a key pair) may be stored by attestation server 150 as one of application keys 132. In some embodiments, this enrollment may be performed when application 122 is installed or if a new user is added. During the enrollment, SEP 130 may derive a public key pair having a public cryptographic key and a private cryptographic key corresponding to application key 132 as stored by attestation server 150. In some embodiments, these derived keys are unique to a given device 100 (or SEP 130)—accordingly, two devices 100 would include different keys. In various embodiments, enrollment may also include SEP 130 generating a certificate for the public key pair—in doing so, SEP 130 may be acting as a certificate authority (CA). This certificate may include the pubic key and be conveyed to remote server 160 along with attestation 134 so that the public key can be used by remote server 160 to verify the attestation 134. In some embodiments, this certificate may include additional content such as a reference to the developer certificate used in the verification, the signed hash values from the certificate, etc.

After enrollment, an application 122 may issue a request 124 for an attestation 134—e.g., when it intends to establish a connection with remote server 160. In response to a successful verification of application 122, in some embodiments, SEP 130 is configured to retrieve the corresponding application key and generate a corresponding attestation 134. As noted above, in some embodiments, this generation of the attestation includes signing a challenge issued by remote server 160. SEP 130 may, however, sign other information to generate attestation 134 such as the hash values generated from application 122, a timestamp, etc. Although not depicted in FIG. 1 for simplicity, SEP 130 may supply the attestation 134 via OS 126 to application 122, which may deliver the attestation request to attestation server 150 for verification. Application 122 may also supply a certificate obtained during enrollment, for example, enrollment by obtaining from attestation server 150 a certification of the public key usable to verify attestation 134. In some embodiments, the application certificate and/or a root certificate associated with manufacturer for device 100 may also be conveyed to attestation server 150 to facilitate verification of the attestation 134.

In embodiments in which attestation server 150 performs verification, attestation server 150 may receive a request 124 including metadata about application 122 to verified by attestation server 150. In the illustrated embodiment, SEP 130 signs the request 124 using a request key 136 in order to attest that the request 124 is coming from a valid device 102 (and also a device including SEP 130). In such an embodiment, attestation server 150 verifies the signature of request 124 along with the accompanying metadata, which may be verified in a similar manner as discussed above. In some embodiments in which attestation server 150 is not responsible for generating attestation 134, attestation server 150 may send a result of the verification to SEP 130 (or more generally device 100), which may generate an attestation 134 based on the received result. In still other embodiments, SEP 130 (or OS 126) may maintain private keys or private portions of application keys, but attestation server 150 may certify its keys 132 in response to receiving and verifying a request 124. In particular, request 124 may be a certificate signing request (CSR) including a public key corresponding to an application key 132 along with a signature generated from the application key 132. After verifying information in request 124, attestation server 150 may certify the key by issuing a corresponding certificate from the application repository operator for the application key 132. This certificate may later be presented with an attestation 134 to remote server 160, which may use the certificate to verify the attestation 134.

In embodiments in which attestation server 150 performs generation of attestation 134, attestation server 150 may use its own signing key(s) to certify the public application key 132 and produce attestation 134 by generating a digital signature as discussed above. In embodiments in which attestation server 150 performs application verification, this attestation 134 may be produced based a result of attestation server 150's verification. In other embodiments, SEP 130 and/or OS 126 may perform the verification and indicate a result of the verification to attestation server 150 to cause it to provide an attestation 134.

II. Application Clips

In exemplary embodiments described below, a transient version an application (application clip) is available from an application repository (an "app store"). The application clip can be used to provide limited functions to a computing device and can include a unique application identifier and an application group identifier that is shared with a corresponding full version of an application.

Figure 2:
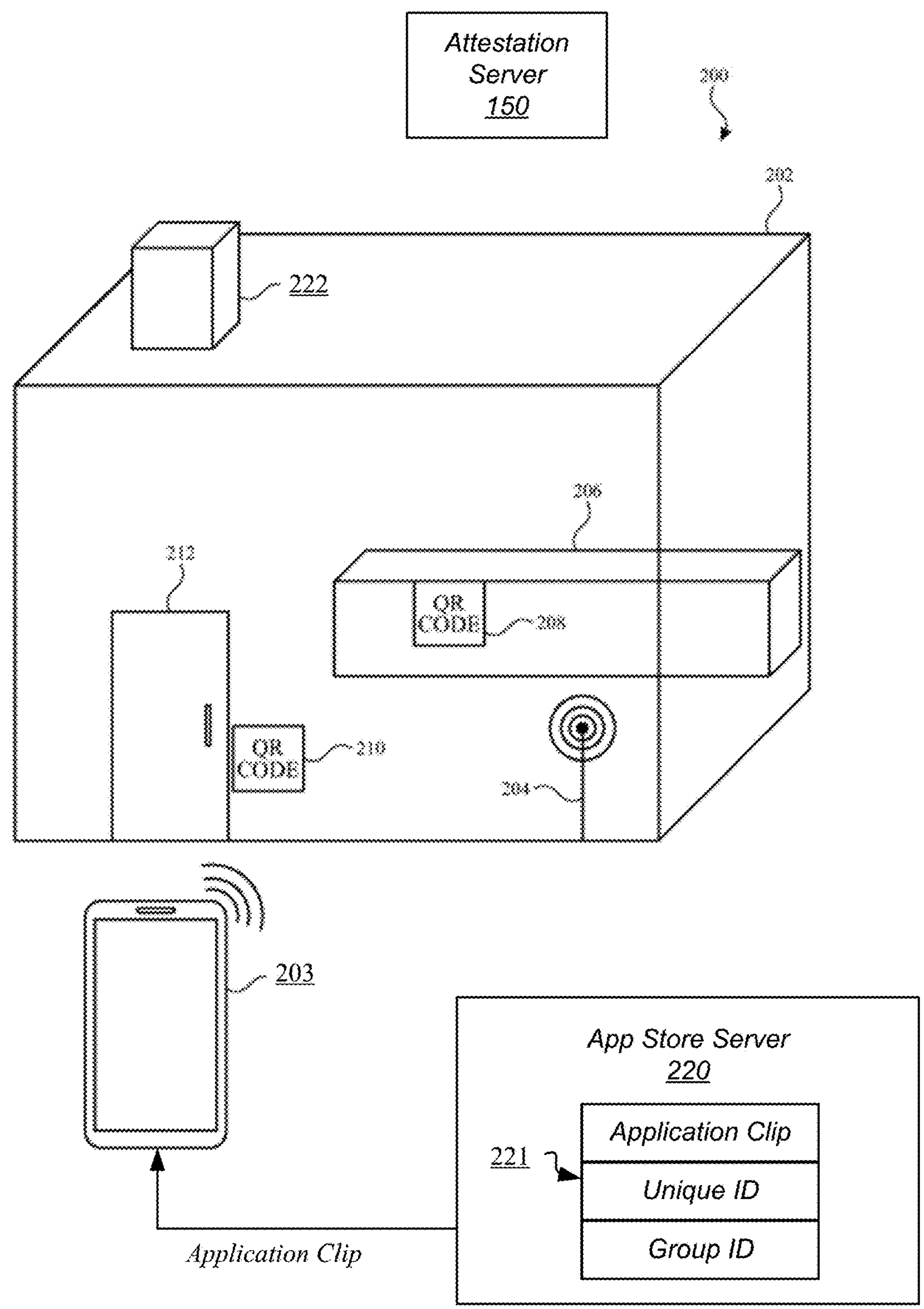
FIG. 2 illustrates an exemplary environment in which a computing device may obtain a transient version of an application according to certain aspects of the present disclosure.

FIG. 2 illustrates an example environment 200 in which a computing device may obtain a transient version of an application, which may also be referred to as an application clip. The environment 200 includes a physical store 202, a computing device 203, and a wireless access point 204 (e.g., a Wi-Fi access point, a cellular access point, an NFC access point, and/or the like). The environment 200 allows for the computing device 203 to identify a transient version of an application that is not installed on computing device 203, the transient version of the application being available for immediate use with computing device 203 (e.g., without authentication of a user account of a user of the computing device 203). The transient version (or "application clip") may have reduced-functionality as compared to the full version of the application, and is treated as a separate application by the computing device. In some examples, the application clip and/or the application may be associated with the store 202 (e.g., an application associated with a particular online and/or brick-and-mortar retailer).

The application clip 221 can be obtained from an application repository ("app store") server 220. The full version of the application may be obtained later from server 220, when the a user of computing device 203 accesses server 220, selects the application from various applications in the app store, provides authenticating information to the server 220 to verify access to a user account at the application repository server 220, downloads, and installs the code for the application. Server 220 includes the application clip 221 and application clip 221 includes a unique application identifier (unique ID) and an application group ID. The unique ID enables both server 220 and the computing device to identify the application clip as a separate application from the full version of the application so that the application clip can be independently maintained, updated, installed, and uninstalled.

In various operational scenarios, the user may not need all of the functionality of the full application, and/or the user may not be able to, or desire to, spend the time and/or energy to locate, authenticate for, download, install, and launch the full application. For example, in the network environment of FIG. 2, the user of computing device 203 may arrive and/or walk into store 202 without having installed the full application associated with the store on computing device 203. However, the user may benefit from the ability to use one or more portions of the functionality of the application for store 202 while at the store. For example, the user may desire to use the payment functionality of the application to pay for a good or a service at the store 202.

In these scenarios, it may be helpful to provide the user with the ability to obtain one or more of the reduced-functionality, or transient versions (application clips) corresponding to the application without having to spend the time and energy of locating, authenticating for, downloading, and installing the full application. For example, the application clip may be temporarily installed on computing device 203 (e.g., when the user arrives at or enters store 202) and then deleted after a period of non-use and/or when the user obtains the full version of the application. An application clip can include functionality that is different from (or not included in) the full version of the application, may use a different code structure, and in the examples described herein, has a unique application identifier (application ID) and for most intents and purposes is treated as a separate application.

The environment 200 allows for the computing device 203 to obtain a network identifier or network locator such as a uniform resource locator (URL) or a uniform resource identifier (URI) for an application (e.g., the full application associated with store 202) and to obtain, using the uniform resource locator, an application clip that includes less functionality than a full version of the application.

The computing device 203 may determine that an application clip associated with the URL is not installed on the computing device based on a local determination that the applications that are installed on the device are not associated with the URL (e.g. using URL information stored at the computing device for the installed applications prior to determining whether any versions of the application are available) or using application identifier(s).

In various scenarios, the uniform resource locator (URL) for the application clip may be obtained when the user clicks a link (e.g., a link on a Web page, in an email or a text message, or a link within another application, such as a social media application, a voice-activated assistant application or any other application, running on computing device 203), when the user scans (e.g., using a camera or an NFC component of the electronic device) a code associated with store 202 and/or a particular location, and/or based on the location of computing device 203 (e.g. when computing device 203, a local server 222 at store 202, and/or application repository server 220 determines that computing device 203 is at or near store 202 such as using geolocation operations and/or one or more wireless beacons).

In one example, the user may click a link for a Web page associated with the store 202 using a browser on computing device 203 (or click a link within the Web page or another Web page) that maps to an application associated with store 202 (e.g., based on a mapping between the URL and an application identifier that has been previously registered). In other examples, the user may select or otherwise opt to open a link provided from another application running on the electronic device (e.g., a geographical maps application), or provided in a message or an email.

In another example the user may use a camera or other sensor of computing device 203 to scan a code such as a bar code or a QR code associated with the store, and obtain the uniform resource locator can be obtained by the electronic device based on the scanned code. For example, the computing device 203 may derive the URL directly from the QR code, or may communicate with local server 222 and/or application repository server 220 to obtain the URL based on the code.

In another example, computing device 203 may communicate with one or more access points such as wireless access point 204 to determine that the computing device 203 is at or near the location of store 202. Computing device 203 may communicate with local server 222 associated with store 202 and/or with application repository server 220 to determine obtain a network identifier such as a URL for an application clip associated with store 202 based on the location of computing device 203 at or near the store. Attestation can be provided for an application clip using previously mentioned attestation server 150, and as described below with respect to FIG. 3.

The environment 200 may facilitate providing one or more application clips corresponding to an application for computing device 203, based on a determination that the location of the computing device 203 is within the store 202 or within a threshold distance of the store 202. Examples of the store 202 include, but are not limited to, a retail store, a dine-in restaurant, a drive-through restaurant, a showroom, a kiosk, a gas station, a museum, an amusement park, a public park, a tourist landmark, an indoor shopping mall, an outdoor shopping mall, a sports venue, a music venue, or any identifiable location, such as any location that can be geo-fenced.

In the example of FIG. 2, the computing device 203 is located outside the entrance 212 of the store 202. However, the user may be traveling, for example, by a vehicle (e.g., an automobile, a motorcycle, a bicycle) that is located within a threshold distance of the store 202. For example, if the store 202 is a drive-through restaurant, the user may be traveling by automobile in the drive-through lane, which is at a predetermined position and distance with respect to the physical restaurant.

In addition to contributing to the position solution of the computing device 203, the wireless access point 204 may also be used to connect the computing device 203 to a network, such as a local area network, a private network (e.g., an intranet associated with local server 222), and/or a public network (e.g., the Internet). For example, wireless access point 204 may connect the computing device 203 to an intranet associated with the store 202 and/or local server 222 for obtaining a URL of an application or the corresponding application clip. Alternatively or in addition, one or more of the wireless access points such as wireless access point 204 may connect the computing device 203 to application repository server 220 (e.g., via the Internet).

III. Attestation of an Application Clip

In exemplary embodiments described below, a transient version an application (application clip) is obtained for use on a computing device. The application clip can be obtained through use of a URL, or by searching an app store. After installation, an attestation for the application clip can be provided.

Figure 3:
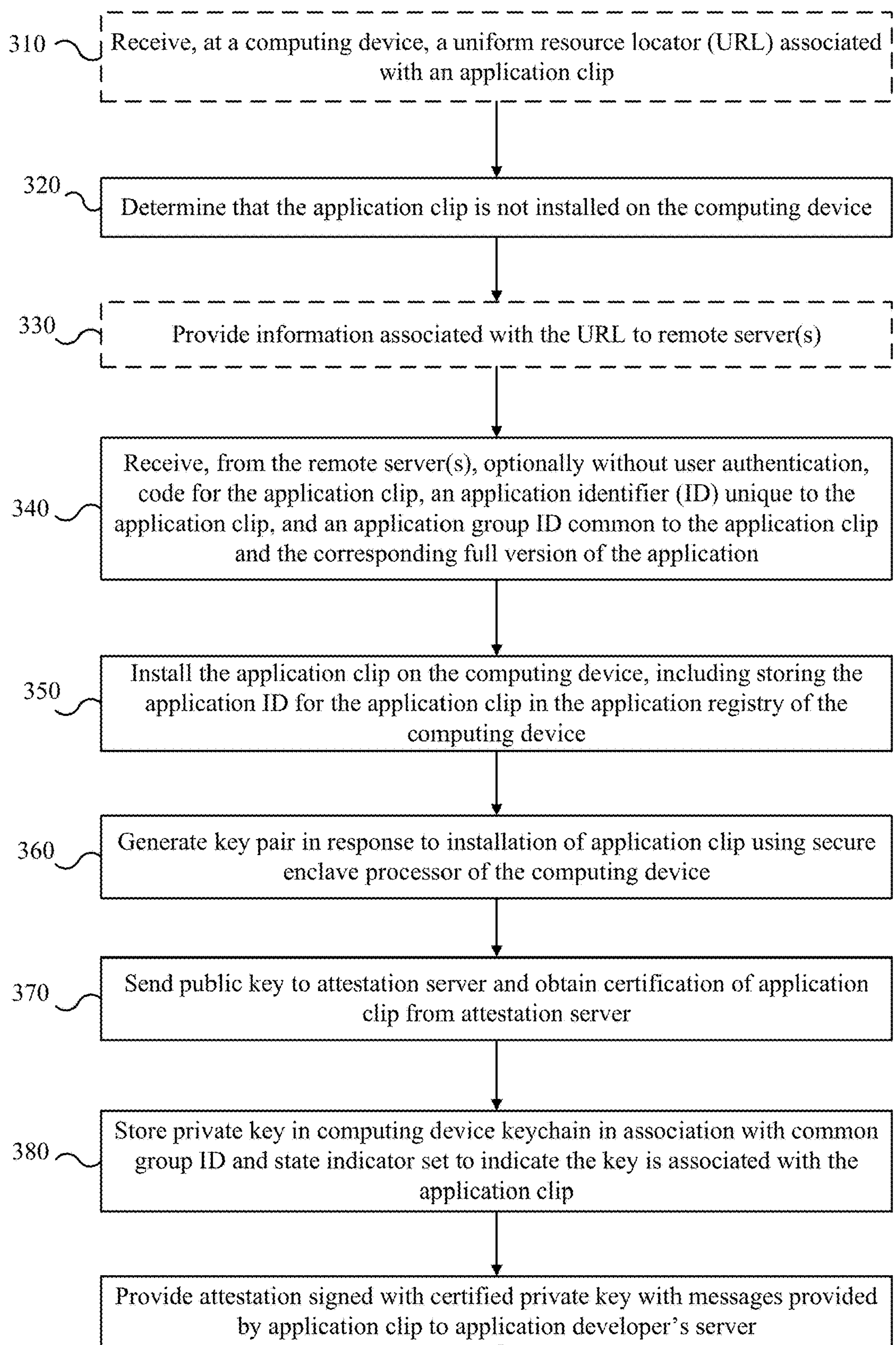
FIG. 3 illustrates an exemplary flowchart for obtaining an transient version of an application and providing attestation of the transient version of the application according to certain aspects of the present disclosure.

FIG. 3 is a flowchart of an example process 300 associated with techniques for providing integrity attestation for application clips. In some implementations, one or more process blocks of FIG. 3 may be performed by a computing device (e.g., computing device 102 of FIG. 1, computing device 203 of FIG. 2, or mobile device 900 discussed below with respect to FIG. 9). Additionally, or alternatively, one or more process blocks of FIG. 3 may be performed by one or more components of these devices, such as CPU 110, memory 120, or operating system 126.

At 310, a computing device optionally receives a uniform resource locator (URL) associated with an application clip. As examples, the computing device may receive the URL using a QR code as described with respect to FIG. 2. The user may also input a URL for an app store, access an app store application installed on the device, or otherwise search for the application clip in the app store.

At 320, the computing device determines that the application clip is not installed. For example, the computing device may check a stored application registry to determine that an application identifier corresponding to the application clip is not present.

At 330, the computing device provides information associated with the URL, as applicable, to one or more remote servers. The information may include the IP address or information regarding the domain name within the URL. The information may also include a reference to an app store from which the application clip can be retrieved.

At 340, the computing device receives, from the one or more remote servers, optionally without user authentication, code for the application clip. In some implementations, the computing device also receives an application identifier (ID) that is unique to the application clip and an application group ID that is common to the application clip and a corresponding full version of the application. The group ID is used to tie the transient version (the application clip) and the full version of the application together, since the two versions can include functionality that is different, may use a different code structure, and each has a unique application identifier (application ID). The two versions are unique applications and would be treated distinctly in most circumstances were it not for the application group ID tying the two versions together.

At 350, the computing device installs the application clip. Installing the application clip may include storing the unique application ID for the application clip in the application registry for the computing device.

At 360, the computing device generates the key pair within a secure enclave. For example, the key pair may be generated within SEP 130 as shown in FIG. 1.

At 370, the computing device sends at least the public key to a first server, for example, an attestation server, to obtain certification of the application clip. For example, the computing device sends the key to attestation server 150 of FIG. 1.

At 380, the computing device stores the private cryptographic key in its keychain in association with a common application group ID. The common group ID is used to associate the application clip with one or more full versions of the application, since the application clip is a unique application relative to the full application.

At 390, the computing device provides the attestation, signed with a certified private key, to a second server, for example, to the application developer's server, to access services provided by the application developer. The attestation is provided contemporaneously with, or in advance of, messages sent to the application developer's server.

IV. Upgrading from an Application Clip

In exemplary embodiments described below, management of upgrading from a transient version (application clip) to a full version of application is described. Upgrading from an application clip is described with respect to an example of a keychain architecture, an example illustration of updating the keychain, and examples of a system and flowcharts for an upgrade.

A. Keychain Architecture

An example keychain architecture is described below. Such an architecture may, as an example, be implemented as a secure device keychain.

Figure 4:
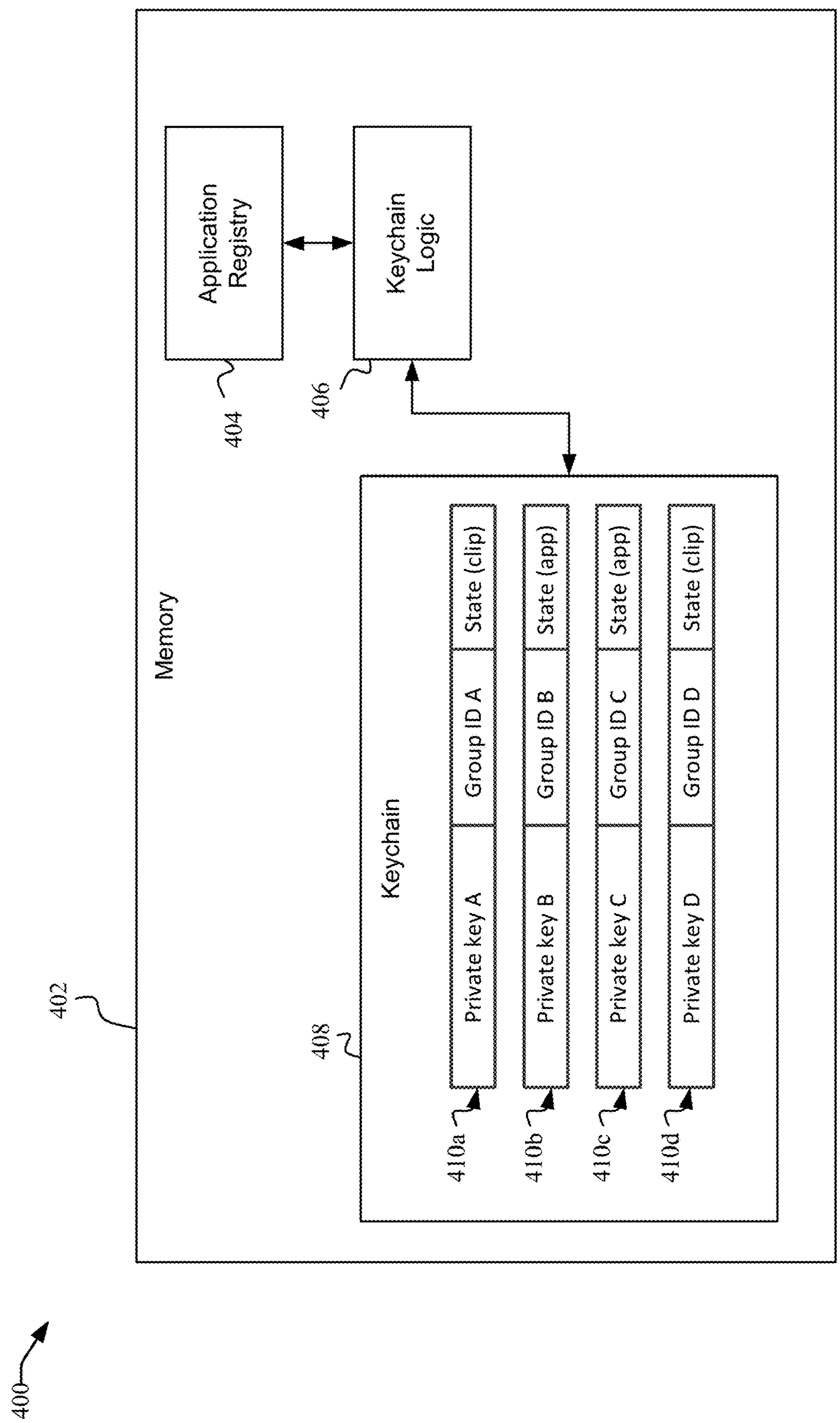
FIG. 4 illustrates an exemplary system for managing stored information pertaining to attestation for corresponding full and transient versions of an application according to certain aspects of the present disclosure.

FIG. 4 shows an exemplary system 400 for managing keychain information pertaining to attestation for corresponding full and transient versions of an application according to certain aspects of the present disclosure. System 400 includes a memory device, memory 402, which may be of various types, possibly depending on the kind of computing device involved. Memory 402 includes an application registry 404 and keychain logic 406 which manages keychain 408 for storing keys for the computing device. The application registry, keychain logic, and keychain may reside in different portions of the computing device. For example, keychain logic 406 may be part of the operating system or a processor. Keychain 408 may be stored in any nonvolatile memory, for example flash, a fixed disc, or writable memory within a CPU or within a SEP.

In some examples, the keychain is different from software or cloud-based keychains because it is isolated from the main processor of the device to provide an extra layer of security. For example, the keychain logic may securely store keys in the device keychain, and perform operations with the keys independently of higher-level processes. The main processor and higher-level processes may receive only the output of these operations, such as encrypted data or a cryptographic signature verification outcome.

Application registry 404 keeps a record of applications installed on the computing device. For example, application registry 404 may store a unique application ID for each installed application. In example implementations, application registry 404 stores the application ID for an application clip installed on the computing device. The application registry 404 also stores the application ID for the full version of the application. Each application ID uniquely identifies either an application clip or a full version of the application as the case may be. Application registry 404 can include application IDs for some application clips, while including application IDs for full applications corresponding to other application clips. Keychain logic 406 accesses, looks up application IDs, inserts and deletes application IDs, and otherwise manages information storage and retrieval for information in the application registry 404 that is needed to manage keychain 408.

Keychain 408 in this example implementation includes private, cryptographic keys used for attestation of both application clips and full applications. In this example, keychain 408 includes four entries, 410*a-d* for private cryptographic keys. Entry 410*a* includes private, cryptographic key A, application group ID A, and a state indicator that indicates cryptographic key A is being used for attestation of an application clip. Entry 410*b* includes private, cryptographic key B, application group ID B, and a state indicator that indicates cryptographic key B is being used for attestation of a full version of an application, for example, because user input or some other mechanism caused the an upgrade from the corresponding application clip to the full application in the case of entry 410*b*. Similarly, entry 410*c* includes private, cryptographic key C, application group ID C, and a state indicator that indicates private, cryptographic key C is being used for attestation of a full version of an application. In one example, keys B and C were each also used for the corresponding application clips, but were retained in the keychain despite the deletion of the application clips from the computing device. These keys are being reused for the full applications, eliminating the need to obtain new attestation certification or otherwise generate new attestation keys for the full applications. Entry 410*d* includes private, cryptographic key D, application group ID D, and a state indicator that indicates cryptographic key D is still being used for attestation of an application clip.

B. Keychain Update

Figure 5:
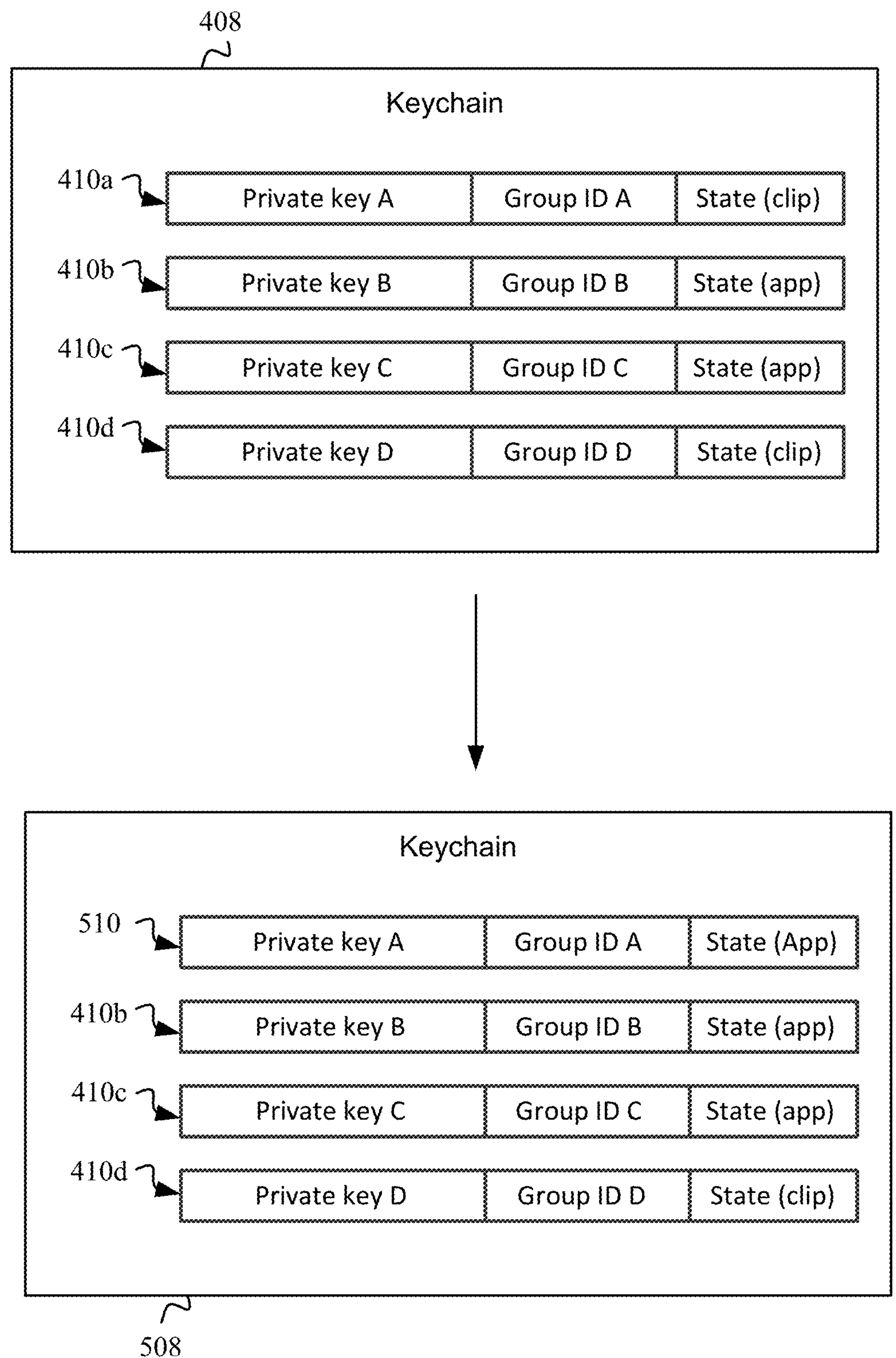
FIG. 5 illustrates an example of updating information pertaining to attestation for corresponding full and transient versions of an application according to certain aspects of the present disclosure.

FIG. 5 shows keychain 408 from system 400. In this example the computing device upgrades the application clip in entry 410*a* to the full version of the application, and keychain 408 is updated, resulting in keychain 508. Keychain 508 includes entries 410*b-d*. However, keychain 508 includes entry 510, in place of entry 410*a*. Entry 510 is similar to entry 410*a* of keychain 408 except that the state indicator now indicates that private key A is in use by the full version of the application. The application group ID is still that of application group ID A, since the application group ID is common to both the application clip and the full version of the application.

C. Upgrade System

Figure 6:
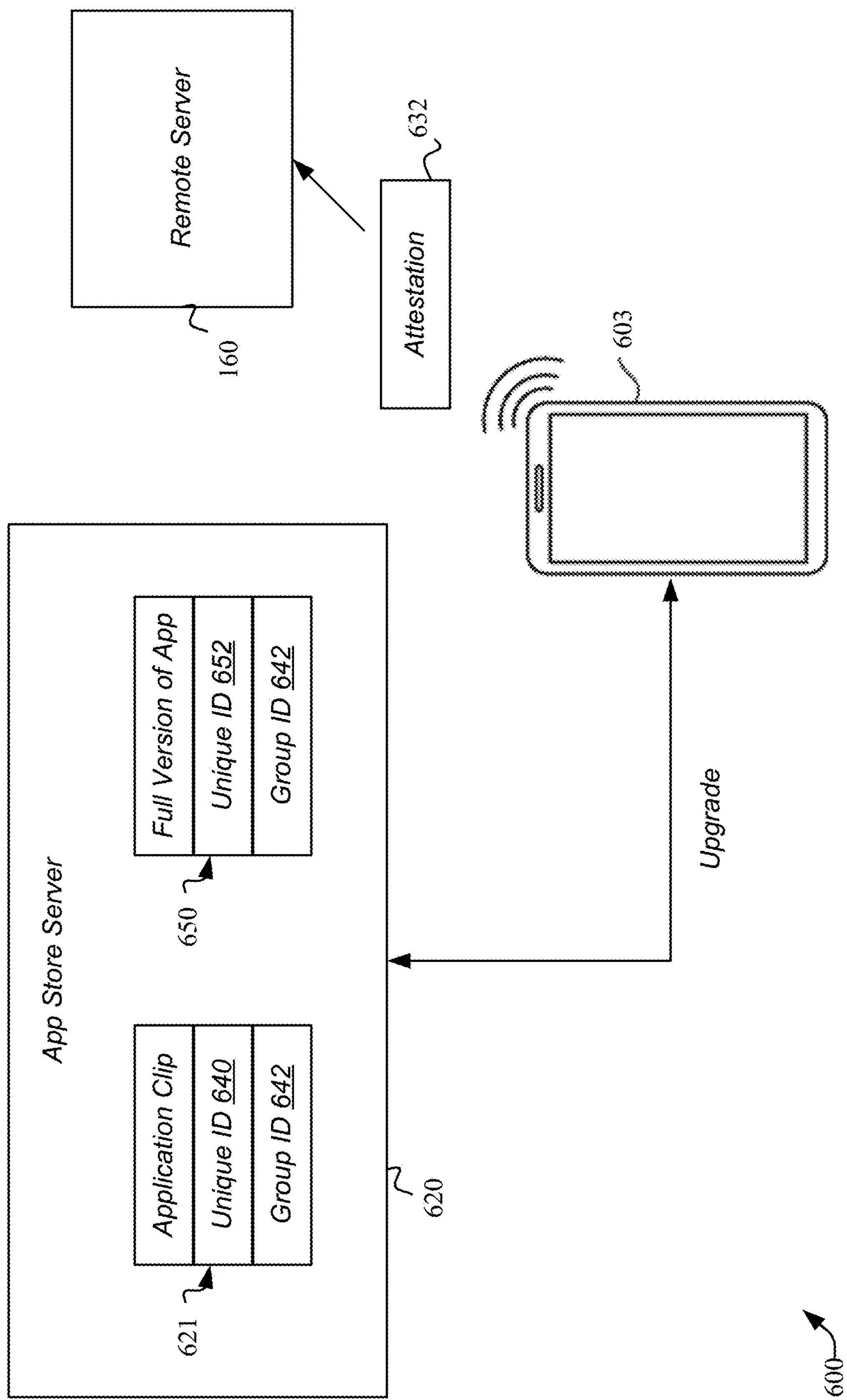
FIG. 6 illustrates an exemplary system for upgrading from a transient version of an application to a corresponding full version of the application according to certain aspects of the present disclosure.

FIG. 6 illustrates an exemplary system 600 for upgrading from a transient version of an application to a corresponding full version of the application according to certain aspects of the present disclosure. System 600 provides computing device 603 with the capability of downloading an application clip and subsequently upgrading the application clip to the full version of the application. Computing device 603 can access app store server 620 to obtain application clip 621. Application clip 621 includes a unique application ID 640, and a common application group ID 642. App store server 620 also includes the full version 650 of the application. Since the full version of the application is a separate application, the full version 650 includes a unique application identifier 652. Full version 650 of the application however, includes common application group ID 642; the same application group identifier as is associated with application clip 621. Computing device 603 can provide attestation 632 remote server 160 while using application clip 621 and continue to provide attestation 632 remote server 160 when accessing remote server 160 using the full version 650 of the application.

D. Upgrade Flows

Figure 7:
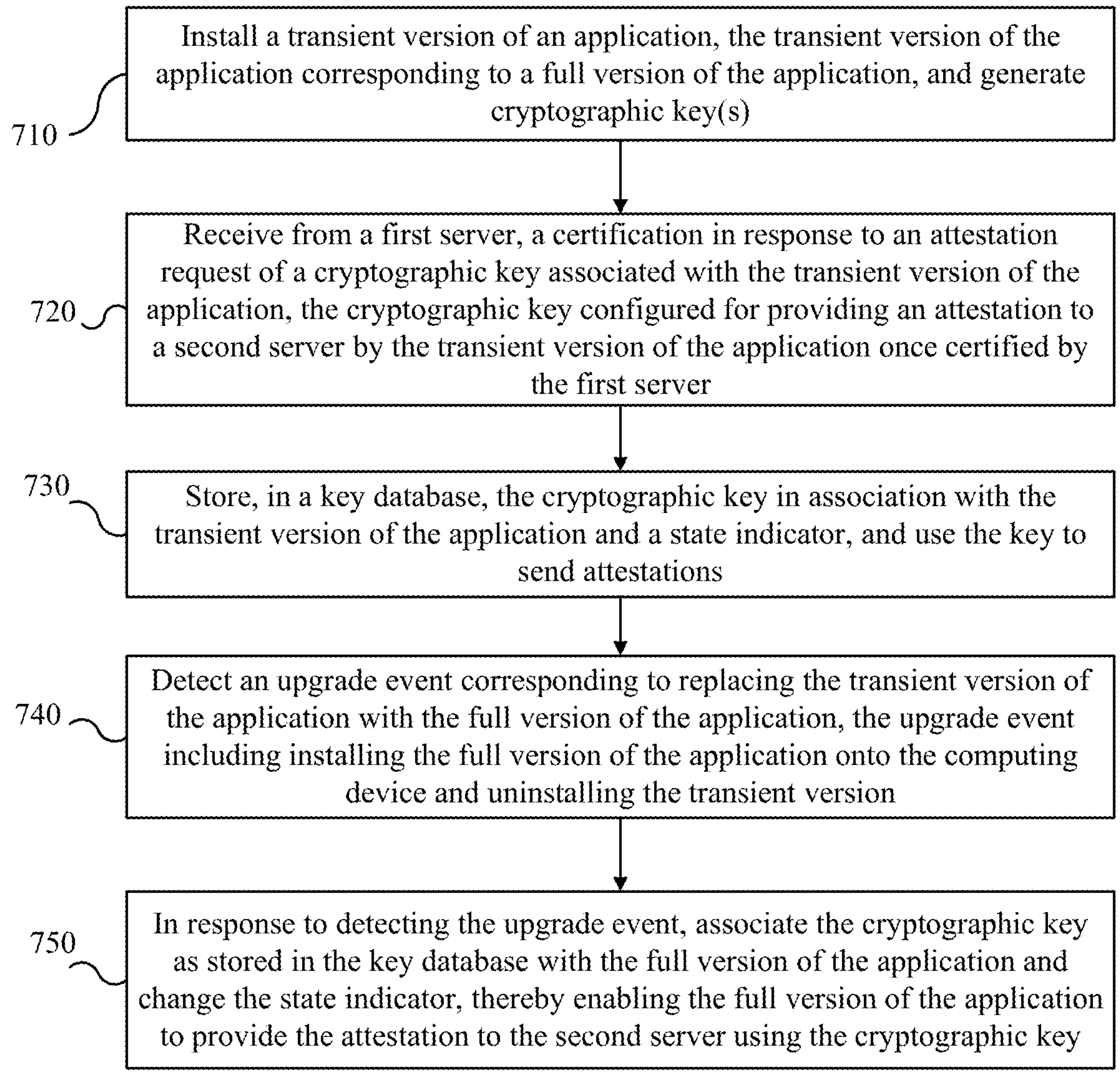
FIG. 7 illustrates an exemplary flowchart for upgrading from a transient version of an application to a corresponding full version of the application while continuing to provide attestation using an existing cryptographic key according to certain aspects of the present disclosure.
Figure 8:
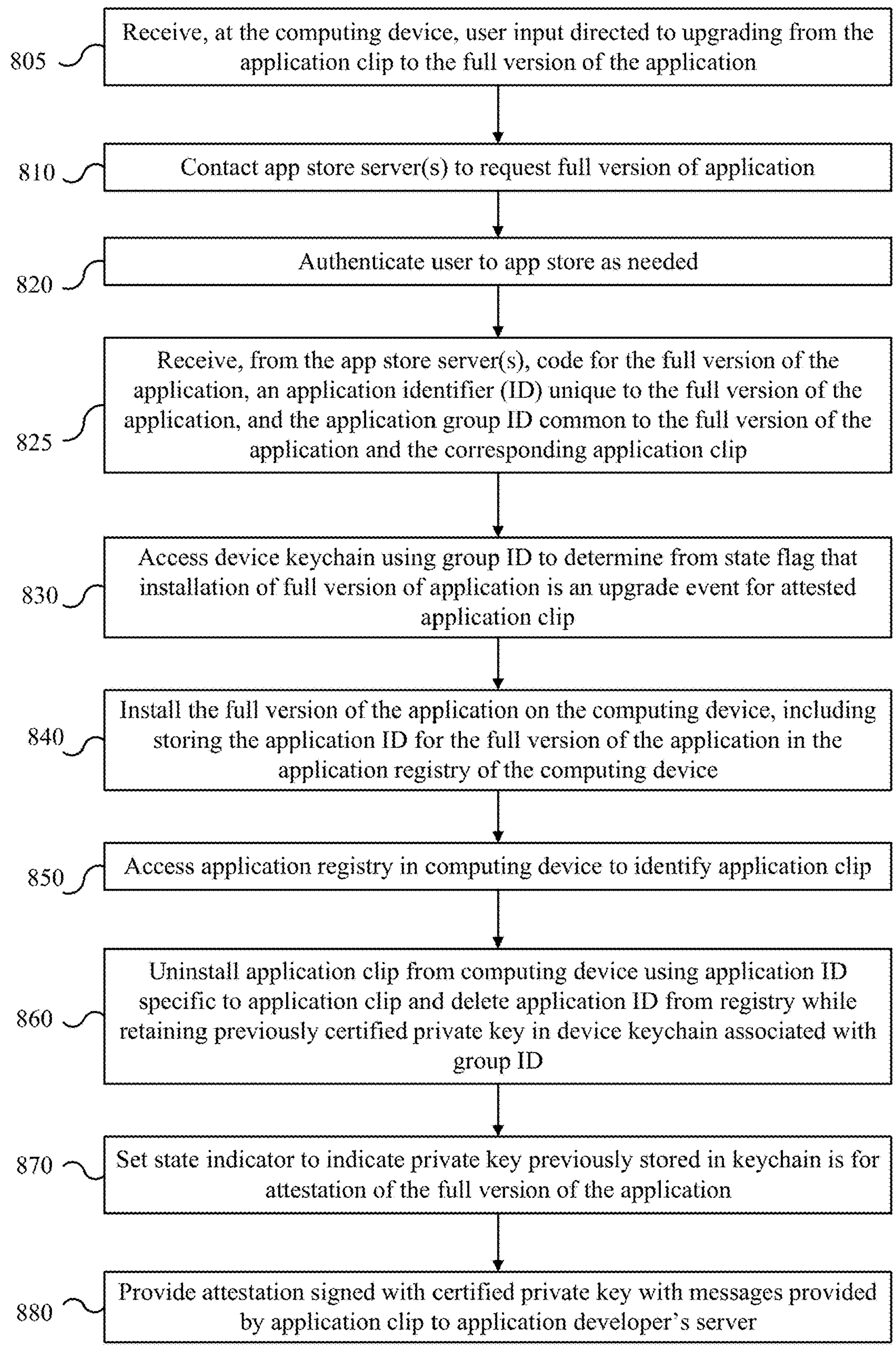
FIG. 8 illustrates an additional exemplary flowchart for upgrading from a transient version of an application to a corresponding full version of the application while continuing to provide attestation using an existing cryptographic key according to certain aspects of the present disclosure.

The flowchart in FIG. 7 illustrates one example of an upgrade process. The flowchart in FIG. 8 illustrates another example of an upgrade process; one that includes user authentication, keychain management, and example specifics of uninstalling the application clip.

FIG. 7 illustrates an exemplary flowchart for upgrading from a transient version of an application to a corresponding full version of the application while continuing to provide attestation using an existing cryptographic key according to certain aspects of the present disclosure. In some implementations, one or more process blocks of FIG. 7 may be performed by a computing device (e.g., computing device 102 of FIG. 1, computing device 203 of FIG. 2, computing device 603 of FIG. 6, or mobile device 900 discussed below with respect to FIG. 9), by using a keychain architecture such as the keychain architecture of system 400 of FIG. 4.

At 710, the computing device installs a transient version of an application. The transient version corresponds to a full version of the application. For example, the computing device may install application clip 621 of system 600. The computing device may generate one or more cryptographic keys.

At 720, the computing device receives, from the first server, certification of a cryptographic key associated with the transient version of the application. The certification may be received in response to an attestation request. The cryptographic key is configured for providing an attestation to the second server once the transient version of the application is certified by the first server. The cryptographic key may be one of a public/private key pair.

At 730, the computing device stores the cryptographic key in its key database. The cryptographic key is stored in association with the transient version of the application. As an example, the cryptographic key may be stored in keychain 408 of system 400. A public key may be included in attestations.

At 740, the computing device detects an upgrade event corresponding to replacing the transient version of the application with the full version of the application. The upgrade event includes installing the full version of the application onto the computing device. For example, full version 650 of the application may be downloaded from app store server 620 as shown in FIG. 6. The transient version may be uninstalled as part of the upgrade event.

In response to detecting the upgrade event, the computing device associates the cryptographic key as stored in the key database with the full version of the application at 750. The computing device can change the state indicator to indicate the stored key is associate with the full version of the application. This enables the full version of the application to provide attestation to the second server using the cryptographic key. The full version of the application does not have to be verified, and a new cryptographic key does not need to be generated, despite the transient version and full version having different application identifiers and being treated as different applications for most purposes.

FIG. 8 illustrates another exemplary flowchart for a process 800 of upgrading from a transient version of an application to a corresponding full version of the application while continuation to provide attestation of the application according to certain aspects of the present disclosure. In some implementations, one or more process blocks of FIG. 3 may be performed by a computing device (e.g., computing device 102 of FIG. 1, computing device 203 of FIG. 2, or mobile device 900 discussed below with respect to FIG. 9), by using a keychain architecture such as the keychain architecture of system 400 of FIG. 4.

At 805, the computing device receives input directed to upgrading from the application clip to the full version of the application. This input may be received via the user interface, or through the application clip, or via messaging between the application clip and the developer's servers.

At 810, the computing device contacts one or more app store servers to request the full version of the application. For example, computing device 603 may contact app store server 620 of system 600.

At 820, the user is authenticated to the app store as needed. At 825, the computing device receives, from the app store server, code for the full version of the application, an application ID that is unique to the full version of the application, and the application group ID common to the full version of the application and the corresponding application clip.

At 830, the computing device accesses the device keychain, for example keychain 408, using the relevant group ID to determine from the state indicator that installation of the full version of the application is an upgrade event for an attested application clip. For example, the computing device may determine from the state indicator in keychain entry 410*a* that the application clip with application group ID A is to be upgraded to the full version of the application.

At 840, the computing device installs the full version of the application. The computing device stores the application ID for the full version of the application in the application registry, for example, application registry 404.

At 850, the computing device identifies the application clip by obtaining the application ID. The application ID can be obtained by accessing the registry.

At 860, the computing device uninstalls the application clip using the application ID specific to the application clip. The computing device removes the application clip from storage and may remove its data. The computing device also deletes the application ID from the registry while retaining the previously certified private cryptographic key in the device keychain, as the previously certified private key is associated with the same application group ID as the application clip. For example, private key A in keychain entry 410*a* is retained for providing attestation for the full version of the application.

At 870, the state indicator in keychain 408 is set to indicate that the corresponding private key previously stored in the keychain is now used for attestation of the full version of the application. For example, keychain 408 is updated to keychain 508 as described with respect to FIG. 5.

At 880, messages forwarded to the application developer's servers by the full version of the application can provide attestation signed with the previously certified private key. There is no need for the computing device to generate new keys or obtain a new certification, or for recertification of existing keys.

V. Exemplary Computing Devices

Figure 9:
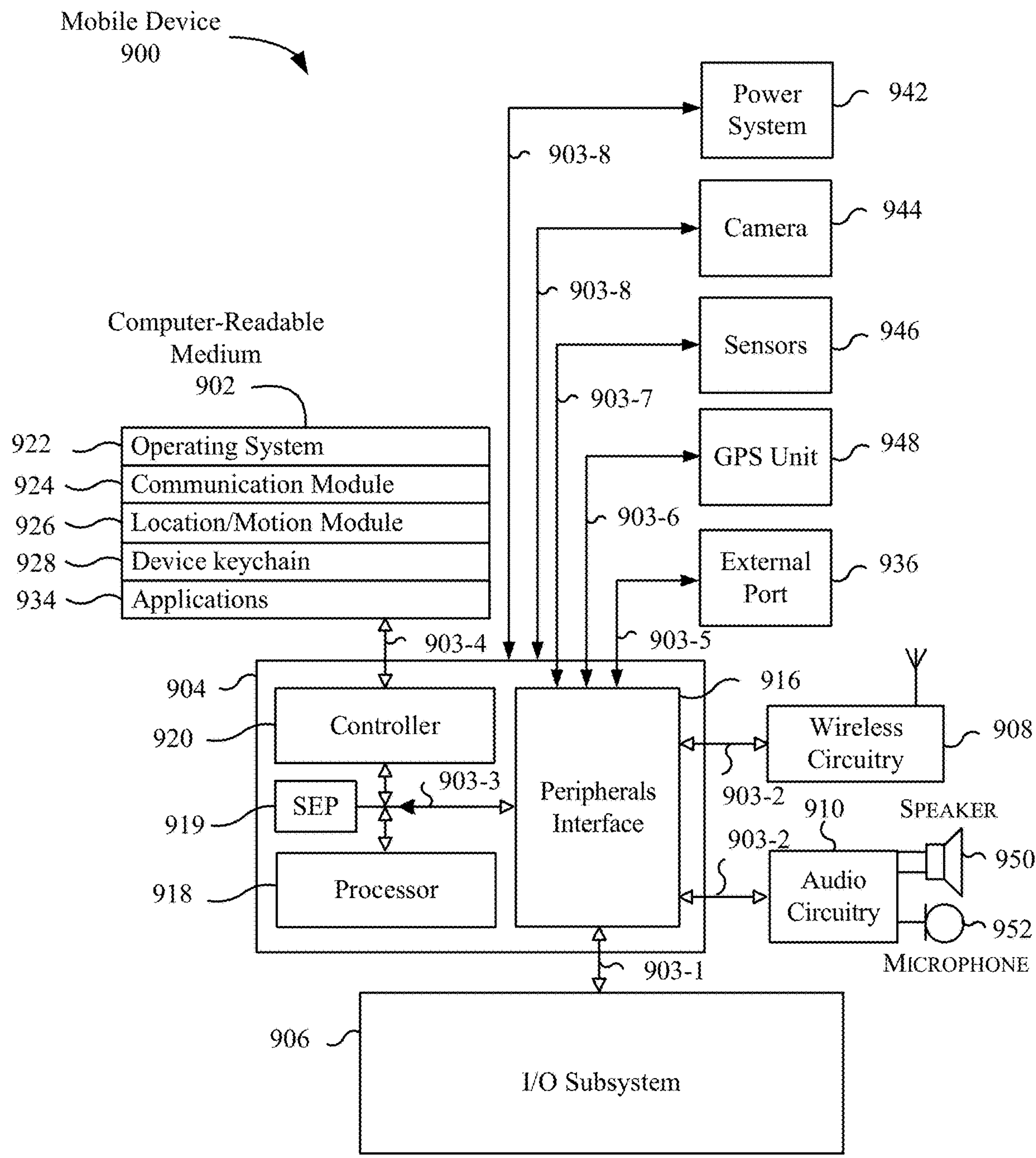
FIG. 9 is a block diagram for an exemplary computing device according to certain aspects of the present disclosure.

FIG. 9 is a block diagram of an example device 900, which may be a mobile device. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902. Processing system 904 can include a SEP 919 to generate cryptographic keys.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a device keychain 928, and other applications (or set of instructions) 934. The device keychain may be stored in medium 902 with keychain logic being part of operating system 922. Alternatively, either or both of the device keychain or keychain logic may be stored within another component such as processor 918 or SEP 919.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Device keychain 928 stores keys for the computing device. Keychain 928 may be stored in any nonvolatile memory, for example flash, a fixed disc, or writable memory within processor 918 or within SEP 919. Keychain 928 in this example includes private, cryptographic keys used for attestation of both application clips and full applications. Keys being used for attestation of a full version of an application may be used because user input or some other mechanism caused an upgrade from the corresponding application clip to the full application. Some keys can be reused for the full applications, eliminating the need to obtain new attestation certification or otherwise generate new attestation keys for the full applications.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. "Applications" 934 include both full applications and application clips that can be attested using keys from device keychain 928.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

What is claimed is:

1. A method comprising performing, by a computing device:

installing a transient version of an application, the transient version of the application corresponding to a full version of the application;

receiving from a first server, a certification of a cryptographic key associated with the transient version of the application, the cryptographic key configured for providing an attestation to a second server by the transient version of the application once certified by the first server;

storing, in a key database, the cryptographic key in association with the transient version of the application;

detecting an upgrade event corresponding to replacing the transient version of the application with the full version of the application, the upgrade event including installing the full version of the application onto the computing device; and in response to detecting the upgrade event, associating the cryptographic key as stored in the key database with the full version of the application, thereby enabling the full version of the application to provide the attestation to the second server using the cryptographic key.

2. The method of claim 1, wherein storing, in the key database, the cryptographic key in association with the transient version of the application comprises storing the cryptographic key in association with a group identifier configured to be associated with either or both of the transient version or the full version of the application.

3. The method of claim 1, wherein the cryptographic key is a private key, the method further comprising:

generating, by the computing device, a key pair including the private key and a public key; and sending an attestation request including the public key to the first server, the attestation request configured to prompt the certification.

4. The method of claim 3, further comprising:

sending the attestation for the transient version of the application to the second server prior to the upgrade event, the attestation including the public key; and sending the attestation for the full version of the application to the second server after the upgrade event.

5. The method of claim 1, wherein storing the cryptographic key in association with the transient version of the application comprises storing the cryptographic key in association with a state indicator configured to selectively indicate that the cryptographic key is associated with the transient version or the full version of the application.

6. The method of claim 5, further comprising uninstalling the transient version of the application while retaining the cryptographic key in the key database as part of the upgrade event.

7. The method of claim 6, further comprising setting the state indicator in response to the upgrade event to indicate that the cryptographic key is associated with the full version of the application.

8. The method of claim 1, further comprising accessing an application identifier in an application registry to identify the transient version of the application for deletion, the application identifier being specific to the transient version of the application.

9. A non-transitory computer-readable medium storing a plurality of instructions that, when executed by one or more processors of a computing device, causes the one or more processors to:

install a transient version of an application, the transient version of the application corresponding to a full version of the application;

receive from a first server, a certification of a cryptographic key associated with the transient version of the application, the cryptographic key configured for providing an attestation to a second server by the transient version of the application once certified by the first server;

store, in a key database, the cryptographic key in association with the transient version of the application;

detect an upgrade event corresponding to replacing the transient version of the application with the full version of the application, the upgrade event including installing the full version of the application onto the computing device; and in response to detecting the upgrade event, associate the cryptographic key as stored in the key database with the full version of the application, thereby enabling the full version of the application to provide the attestation to the second server using the cryptographic key.

10. The non-transitory computer-readable medium of claim 9, wherein the instructions that store, in the key database, the cryptographic key in association with the transient version of the application comprise instructions that cause the one or more processors to store the cryptographic key in association with a group identifier configured to be associated with either or both of the transient version or the full version of the application.

11. The non-transitory computer-readable medium of claim 9, wherein the cryptographic key is a private key, the instructions further causing the one or more processors to:

generate, by the computing device, a key pair including the private key and a public key;

send an attestation request including the public key to the first server, the attestation request configured to prompt the certification;

send the attestation for the transient version of the application to the second server prior to the upgrade event, the attestation including the public key; and send the attestation for the full version of the application to the second server after the upgrade event.

12. The non-transitory computer-readable medium of claim 9, wherein the instructions that store the cryptographic key in association with the transient version of the application comprise instructions that cause the one or more processors to store the cryptographic key in association with a state indicator configured to selectively indicate that the cryptographic key is associated with the transient version or the full version of the application.

13. The non-transitory computer-readable medium of claim 12, the instructions further causing the one or more processors to:

uninstall the transient version of the application while retaining the cryptographic key in the key database as part of the upgrade event; and set the state indicator in response to the upgrade event to indicate that the cryptographic key is associated with the full version of the application.

14. The non-transitory computer-readable medium of claim 9, the instructions further causing the one or more processors to access an application identifier in an application registry to identify the transient version of the application for deletion, the application identifier being specific to the transient version of the application.

15. A computing device comprising:

one or more memories; and one or more processors communicatively coupled to the one or more memories and configured to execute instructions stored in the one or more memories for performing operations of:

installing a transient version of an application, the transient version of the application corresponding to a full version of the application;

receiving from a first server, a certification of a cryptographic key associated with the transient version of the application, the cryptographic key configured for providing an attestation to a second server by the transient version of the application once certified by the first server;

storing, in a key database, the cryptographic key in association with the transient version of the application;

detecting an upgrade event corresponding to replacing the transient version of the application with the full version of the application, the upgrade event including installing the full version of the application onto the computing device; and in response to detecting the upgrade event, associating the cryptographic key as stored in the key database with the full version of the application, thereby enabling the full version of the application to provide the attestation to the second server using the cryptographic key.

16. The computing device of claim 15, wherein the instructions that store, in the key database, the cryptographic key in association with the transient version of the application comprise instructions for performing the operation of storing the cryptographic key in association with a group identifier configured to be associated with either or both of the transient version or the full version of the application.

17. The computing device of claim 15, wherein the cryptographic key is a private key, the one or more processors configured to execute instructions for performing the operations of:

generating, by the computing device, a key pair including the private key and a public key;

sending an attestation request including the public key to the first server, the attestation request configured to prompt the certification;

sending the attestation for the transient version of the application to the second server prior to the upgrade event, the attestation including the public key; and sending the attestation for the full version of the application to the second server after the upgrade event.

18. The computing device of claim 15, wherein the instructions that store the cryptographic key in association with the transient version of the application comprise instructions for performing the operation of storing the cryptographic key in association with a state indicator configured to selectively indicate that the cryptographic key is associated with the transient version or the full version of the application.

19. The computing device of claim 18, the one or more processors configured to execute instructions for performing the operations of:

uninstalling the transient version of the application while retaining the cryptographic key in the key database as part of the upgrade event; and setting the state indicator in response to the upgrade event to indicate that the cryptographic key is associated with the full version of the application.

20. The computing device of claim 15, the one or more processors configured to execute instructions for performing the operation of accessing an application identifier in an application registry to identify the transient version of the application for deletion, the application identifier being specific to the transient version of the application.

* * * * *